United States Patent
Prock et al.

(10) Patent No.: US 8,732,937 B2
(45) Date of Patent: May 27, 2014

(54) APPARATUS AND METHOD FOR CUTTING TEETH IN WORKPIECES AND ASSOCIATED TOOL SET

(71) Applicants: Erich Prock, Ravensburg (DE); Marcel Sobczyk, Solingen (DE)

(72) Inventors: Erich Prock, Ravensburg (DE); Marcel Sobczyk, Solingen (DE)

(73) Assignee: Profilator GmbH & Co. KG (DE)

( * ) Notice: Subject to any disclaimer, the term of this patent is extended or adjusted under 35 U.S.C. 154(b) by 0 days.

(21) Appl. No.: 14/067,165

(22) Filed: Oct. 30, 2013

(65) Prior Publication Data

US 2014/0050546 A1 Feb. 20, 2014

Related U.S. Application Data

(60) Division of application No. 13/181,333, filed on Jul. 12, 2011, now Pat. No. 8,596,939, which is a continuation of application No. PCT/EP2009/068026, filed on Dec. 30, 2009.

(30) Foreign Application Priority Data

Jan. 12, 2009 (DE) .......... 10 2009 003 338

(51) Int. Cl.
*B23F 19/10* (2006.01)
*B23F 17/00* (2006.01)
*B23P 23/00* (2006.01)

(52) U.S. Cl.
USPC ............. 29/564; 29/50; 29/893.35; 29/563; 409/8; 409/55; 409/40

(58) Field of Classification Search
USPC ............. 409/8–9, 37, 49, 4, 55, 54, 40, 192, 409/203, 213, 217; 29/564, 50, 56.5, 893.3, 29/893.35, 90.6, 563
See application file for complete search history.

(56) References Cited

U.S. PATENT DOCUMENTS

2006/0174464 A1* 8/2006 Fitzgerald et al. ............. 29/56.5
2009/0142153 A1 6/2009 Prock et al.

FOREIGN PATENT DOCUMENTS

| DE | 29815125 U1 | 11/1998 |
| DE | 10249039 A1 | 5/2004 |
| DE | 10309116 A1 | 9/2004 |
| DE | 102005049528 A1 | 5/2007 |
| DE | 102007015357 A1 | 10/2008 |
| JP | S58143916 A | 8/1983 |

(Continued)

OTHER PUBLICATIONS

Derwent abstract for DE 29815125 U1, which DE '125 was published Nov. 1998.*

(Continued)

*Primary Examiner* — Erica E Cadugan
(74) *Attorney, Agent, or Firm* — St. Onge Steward Johnston & Reens, LLC (57) ABSTRACT

A method and apparatus for cutting teeth in workpieces, wherein, in a roughing operation, a substantially uncut blank receives rough teeth using a cutting tool having cutting teeth. Operation teeth are produced, the tooth width of which is defined by the spacing between the flanks of the teeth and is greater than the target dimension. In a subsequent deburring operation, a chamfer is incorporated into the end face edge of the tooth flanks, accompanied by the removal of an end face burr. Lastly, in a smoothing operation, the tooth width of the teeth is brought to the target dimension by machining the tooth flanks.

4 Claims, 9 Drawing Sheets

(56) References Cited

FOREIGN PATENT DOCUMENTS

| SU | 1148731 A1 | 4/1985 |
|---|---|---|
| SU | 1304995 A1 | 4/1987 |
| WO | 2007045610 A1 | 4/2007 |

OTHER PUBLICATIONS

International Search Report and Written Opinion of the International Searching Authority; PCT/EP2009/068026; Sep. 20, 2010; 11 pages.

* cited by examiner

Fig. 8

APPARATUS AND METHOD FOR CUTTING TEETH IN WORKPIECES AND ASSOCIATED TOOL SET

FIELD OF THE INVENTION

The invention relates to a method for cutting teeth in workpieces, wherein, in a roughing operation, a substantially uncut blank receives rough teeth using a first cutting tool having cutting teeth, in which operation teeth are produced, the tooth width of which is defined by the spacing between the flanks of the teeth and is greater than the target dimension, wherein, in a subsequent deburring operation, a chamfer is incorporated into the end face edge of the tooth flanks, accompanied by the removal of an end face burr, and wherein lastly, in a smoothing operation, the tooth width of the teeth is brought to the target dimension by machining the tooth flanks. The invention further relates to an apparatus for carrying out the method, and a tool set that is suitable for this purpose.

BACKGROUND OF THE INVENTION

For cutting teeth in substantially cylindrical blanks as described, for example, in DE 102 49 039 B4, teeth are first cut into a blank using a gear cutting tool that has cutting teeth. The teeth may be produced by gear hobbing, and preferably by hob peeling. A hob peeling process for cutting teeth in internally or externally geared workpieces is described in DE 10 2005 049 528 A1. In the generic method, rough gearing is first produced using the cutting tool. This is carried out in a roughing operation. Following this first method step, the tooth flanks are deburred, in particular in the region of their end-face edges. The deburring may be carried out using a method as described in abovementioned DE 102 49 039 B4, or also in DE 103 09 116 A1. A chamfer is pressed into the edge region between the tooth flank and the end face of the workpiece. The material that is thus displaced is for the most part pushed into the end face, where it is removed using a deburring wheel. A secondary burr may remain in the flank region. This secondary burr is removed in a third method step, a so-called smoothing operation. The roughing operation and the smoothing operation are carried out using the same cutting tools, which are shaped in such a way that they may be used to produce the tooth gaps and the teeth of the workpiece to the target dimension.

SUMMARY OF THE INVENTION

It is an object of the invention to refine the method described at the outset with regard to its efficiency, and for this purpose to provide a suitable apparatus and a suitable tool set.

The object is achieved by the present invention.

It is first and primarily provided that various tools are used in the method. For the roughing operation, a cutting tool which in particular is gear wheel-shaped is used, the tool providing cutting teeth in the form of roughing teeth. For the smoothing operation, a smoothing tool which likewise is preferably gear wheel-shaped is used, the tool having smoothing teeth that are configured differently from the roughing teeth. The roughing teeth of the roughing tool have a tooth height which produces a tooth gap having a tooth gap height that substantially corresponds to the target dimension. Thus, in the roughing operation, the head of the roughing tooth is used to produce the tooth base of the tooth to be produced. The smoothing teeth associated with the smoothing tool have a lower tooth height. The roughing teeth provided by the roughing tool are narrower than the smoothing teeth provided by the smoothing tool. The smoothing teeth have a configuration by means of which the width of the tooth gaps may be brought to the target dimension. The roughing teeth of the roughing tool are used to produce teeth in the workpiece which, although they have the target height, have a machining allowance with regard to their width. In a refinement of the method, a roller compression tool having compression teeth is used to press chamfers into the edge region of the tooth flanks, which have a smaller width in the base region of the tooth to be produced than in the head region of the tooth to be produced. This widened chamfer extends in the shape of a comma from the head of the tooth to be produced to beyond a middle portion. In the smoothing operation, the portion of the chamfer which is widened in the shape of a comma is narrowed once again by removal of material on the tooth flanks, so that after the smoothing operation the comma-shaped chamfer is reduced to form a parallel chamfer. The smoothing tool is used to machine preferably only the region of the flank of the tooth to be produced which takes part in a force-transmitting rolling-off motion on the tooth flanks of a different tooth when the finished workpiece is used as intended. The roughing operation is carried out at a high feed rate and with a great cutting depth, i.e., with a high cutting power, whereas the smoothing operation is carried out at a low feed rate and with a decreased cutting depth, i.e., with a low cutting power. The roughing tool machines the tooth gap down to the complete depth, with a finishing allowance remaining on the tooth flank, while the smoothing tool is set back in the tooth head region so that the tooth base is not machined further in the smoothing operation.

The apparatus for carrying out the method has a machine base body on which a workpiece spindle is arranged in a linearly displaceable manner. The direction of displacement of the workpiece spindle is substantially transverse to the spindle extent of the workpiece spindle. The workpiece spindle is preferably rotationally drivable by an electric motor. In a first variant, the machine bed carries a total of three tool spindles. In a second variant, only two tool spindles are provided. In the first variant, the roughing tool and the smoothing tool are each accommodated by an individual tool spindle associated with the respective tool. In the second variant, the roughing tool and the smoothing tool are located on a shared tool spindle. To avoid possible collisions, the front tool of the tools axially arranged one behind the other has a smaller diameter than the tool behind it. The two tools differ from one another basically in the number of teeth. The front tool may be the smoothing tool or the roughing tool. The tool spindles may be arranged parallel to one another with their axes extending substantially transverse to the direction of displacement of the workpiece spindle. Depending on the type of teeth to be formed, however, the spindle axes define an axis intersection angle with respect to one another. The tool spindles are associated with the machine base body in a substantially fixed manner. However, the tool spindles may be pivoted in order to adjust the axis intersection angle relative to the direction of the infeed motion of the workpiece spindle. It may also be provided that the tool spindles are able to carry out a feed motion. However, it is also possible for the workpiece spindle to carry out the feed motion. The first tool spindle carries the roughing tool. The second tool spindle carries the roller compression tool. The third tool spindle carries the smoothing tool. The tool spindle associated with the roller compression tool may also be combined with a cutting wheel. The tool spindle carrying the roller compression tool does not have to be rotationally driven. The roller compression tool may be rotationally carried along as a result of the toothed engagement of the roller compression tool with the teeth of the coarsely cut workpiece. If the workpiece spindle and the tool spindle are each rotationally driven by a motor, the motors are synchronized via an electronic control system so that they run at a fixed rotational speed ratio with respect to one another.

The tool set for carrying out the method is basically composed of a gear wheel-shaped roughing tool, a gear wheel-shaped roller compression tool, and a gear wheel-shaped smoothing tool. The cutting teeth of the roughing tool or of the smoothing tool may be located on a helical thread curve, or may extend at an angle or also linearly. The teeth of the roughing tool are longer than the teeth of the smoothing tool. The teeth of the smoothing tool are narrower than the teeth of the roughing tool. The teeth of the roller compression tool have inclined, oppositely situated compression flanks which are able to press comma-shaped chamfers into the tooth flanks produced by the roughing tool, the width of the chamfers in the region of the head of the tooth to be produced and in the region of the middle flank portion of the tooth to be produced being wider than the chamfer produced in the base region of the tooth to be produced.

BRIEF DESCRIPTION OF THE DRAWINGS

Exemplary embodiments of the invention are explained below with reference to accompanying drawings, which show the following.

DETAILED DESCRIPTION OF THE INVENTION

Figure 8:
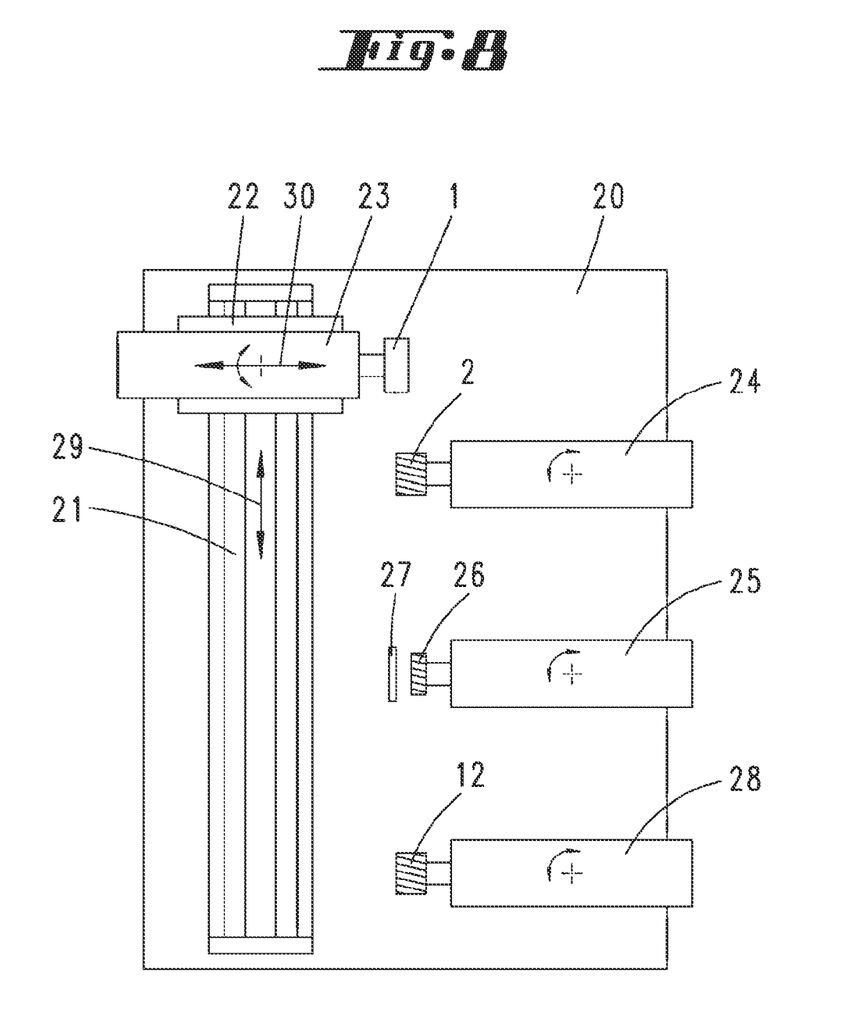
FIG. 8 shows a schematic top view of a machine tool.

FIG. 8 shows the design of a machine tool in a rough schematic manner. A base frame 20 carries a linear guide 21 on which a carriage 22 is movable in the direction of the double arrow 29. The carriage 22 carries a workpiece spindle 23 which is driven by an electric motor and which in its workpiece receptacle carries a cylindrical workpiece 1 that is to be provided with gear teeth, on the machine tool. The workpiece spindle 23 may be displaced in its axial direction along the double arrow 30 for the purpose of forward feed. It is further indicated that the workpiece spindle 23 may also be brought into a rotary position relative to the infeed direction 29.

A first tool spindle 24 is fixedly mounted on the machine bed 20. This tool spindle 24 carries a roughing tool 2, and may be brought into a pivoted position or displaced in its axial direction for the purpose of feed.

A second tool spindle 25 is likewise fixedly mounted on the machine frame 20. The second tool spindle 25 may likewise be brought into a rotary position or displaced in its axial direction for the purpose of feed. The second tool spindle 25 carries a roller compression tool 26 which is combined with a cutting wheel 27. A roller compression tool 26 is described in detail in DE 103 09 116 A1, reference therefore being made to the embodiments therein. The cited document also describes the cutting wheel which cooperates with the roller compression tool.

A third tool spindle 28 is likewise fixedly mounted on the machine bed 20, is pivotable, and is displaceable in the direction of its axis for the purpose of feed. This tool spindle 28 carries a smoothing tool 12.

Figure 9:
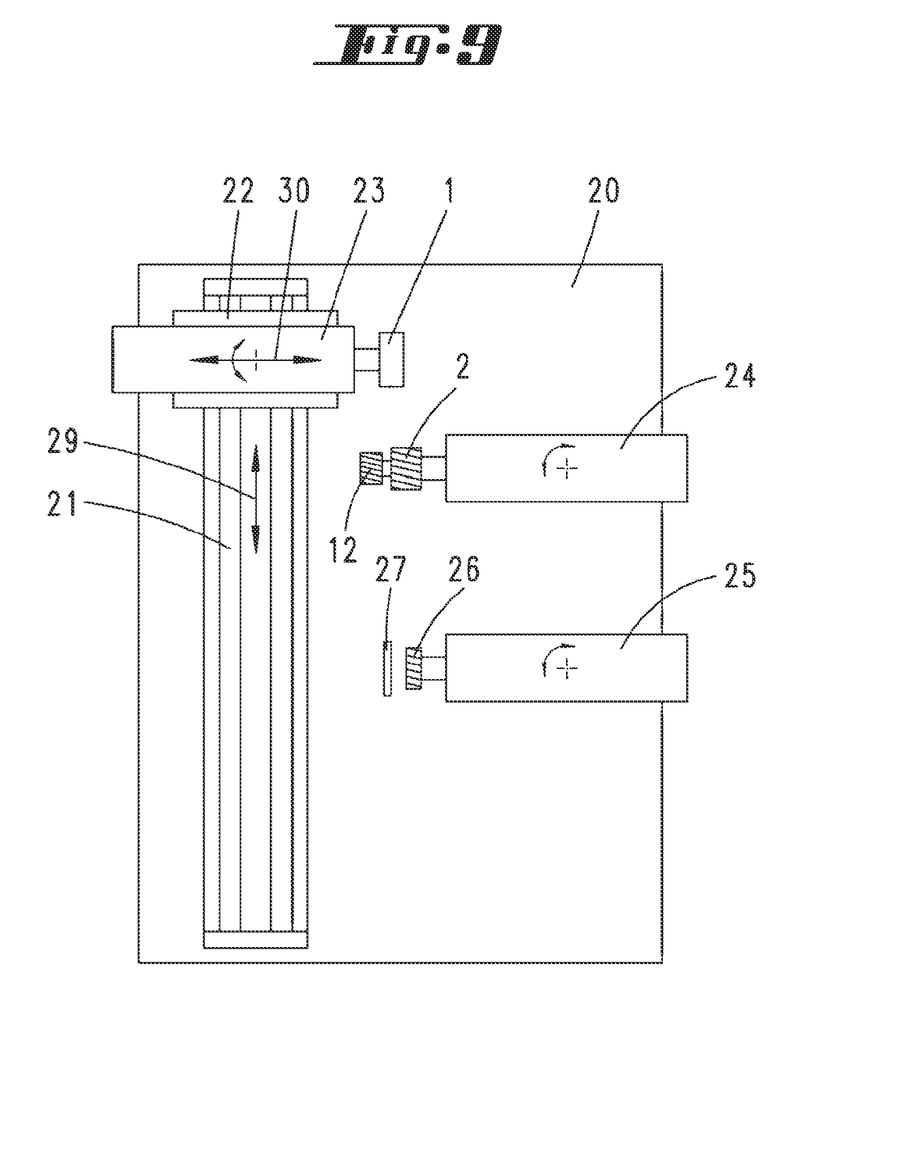
FIG. 9 shows a schematic illustration of a machine tool of another exemplary embodiment.

Only two tool spindles 24, 25 are provided in the exemplary embodiment illustrated in FIG. 9. Tool spindle 24 carries the roughing tool 2 as well as the smoothing tool 12. Both tools 2, 12 are rotationally driven by a common tool spindle 24. The front tool has a smaller diameter than the rear tool in order to avoid possible collisions. The two tools differ in the number of teeth. The spacings and the proportions of the tools 2, 12 are adjusted in such a way that no collisions with the workpiece 1 occur. The front tool may be the smoothing tool 12 or the roughing tool 2. In FIG. 9 the front tool is the smoothing tool.

In the exemplary embodiment, the smoothing tool 12 and the roughing tool 2 have the shape of a gear wheel. The shape of such tools as are described in DE 10 2005 049 528 A1 is suitable.

For cutting teeth in the blank 1, the blank is first accommodated by the chuck of the workpiece spindle 23. The workpiece spindle 23 then moves along the double arrow 29 by displacement of the carriage 22 into a machining position with respect to the roughing tool 2. The teeth of the roughing tool 2 each have tooth flanks 6 which merge into a tooth head 6' and an imaginary tooth base line 6'', which in the engagement position of the roughing tooth 3 in the workpiece 1 illustrated in FIG. 1 extends along the circumferential line of the workpiece 1. The distance of the roughing tooth head 6' from this roughing tooth base line 6'' is the roughing tooth height 4.

Figure 1:
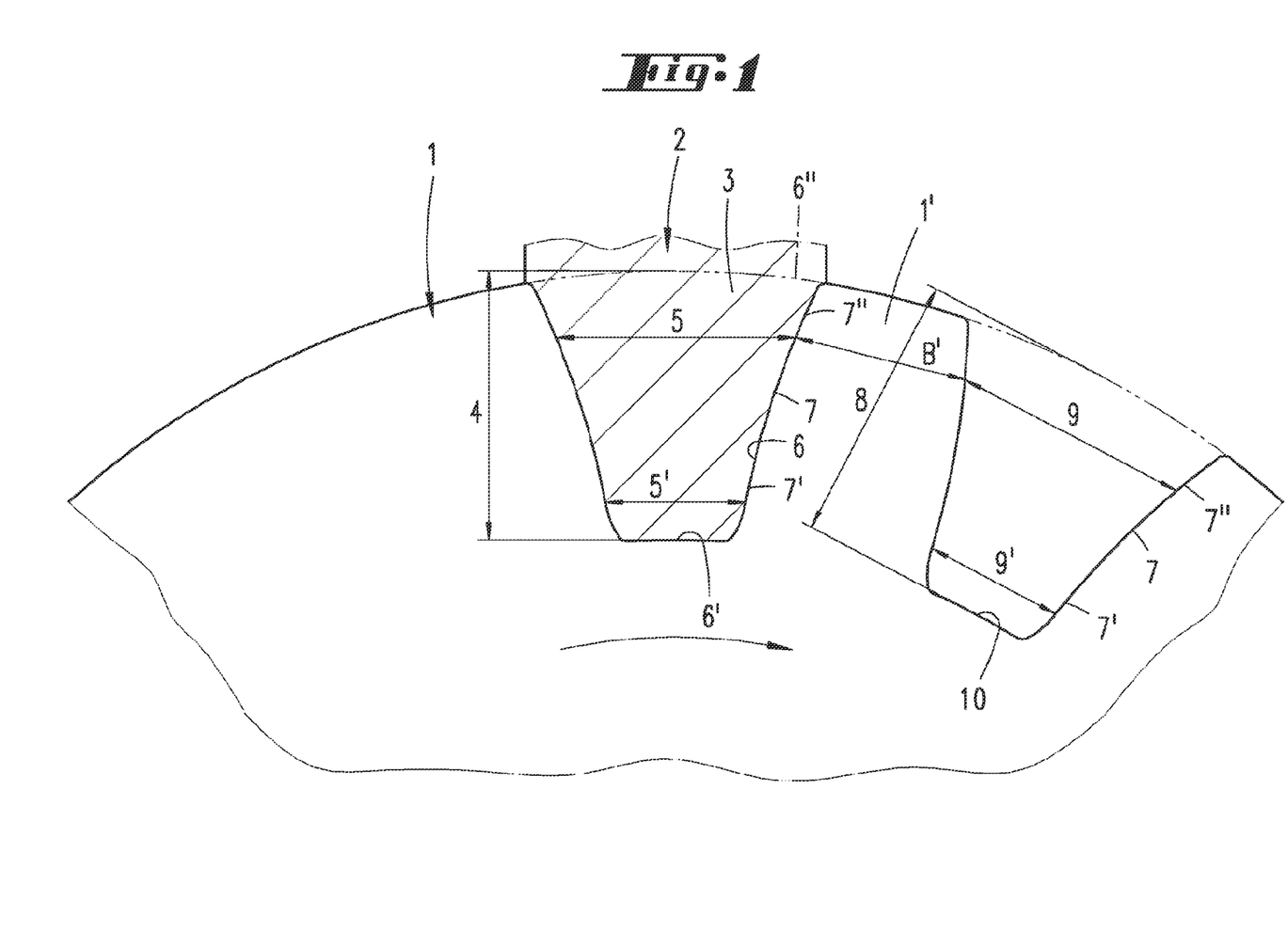
FIG. 1 shows a top view of the end face, i.e., with the rotational axis extending perpendicular to the plane of the drawing, of a portion of a workpiece 1 to be provided with teeth, with which a roughing tooth 3 of a roughing tool 2 is engaged.
Figure 2:
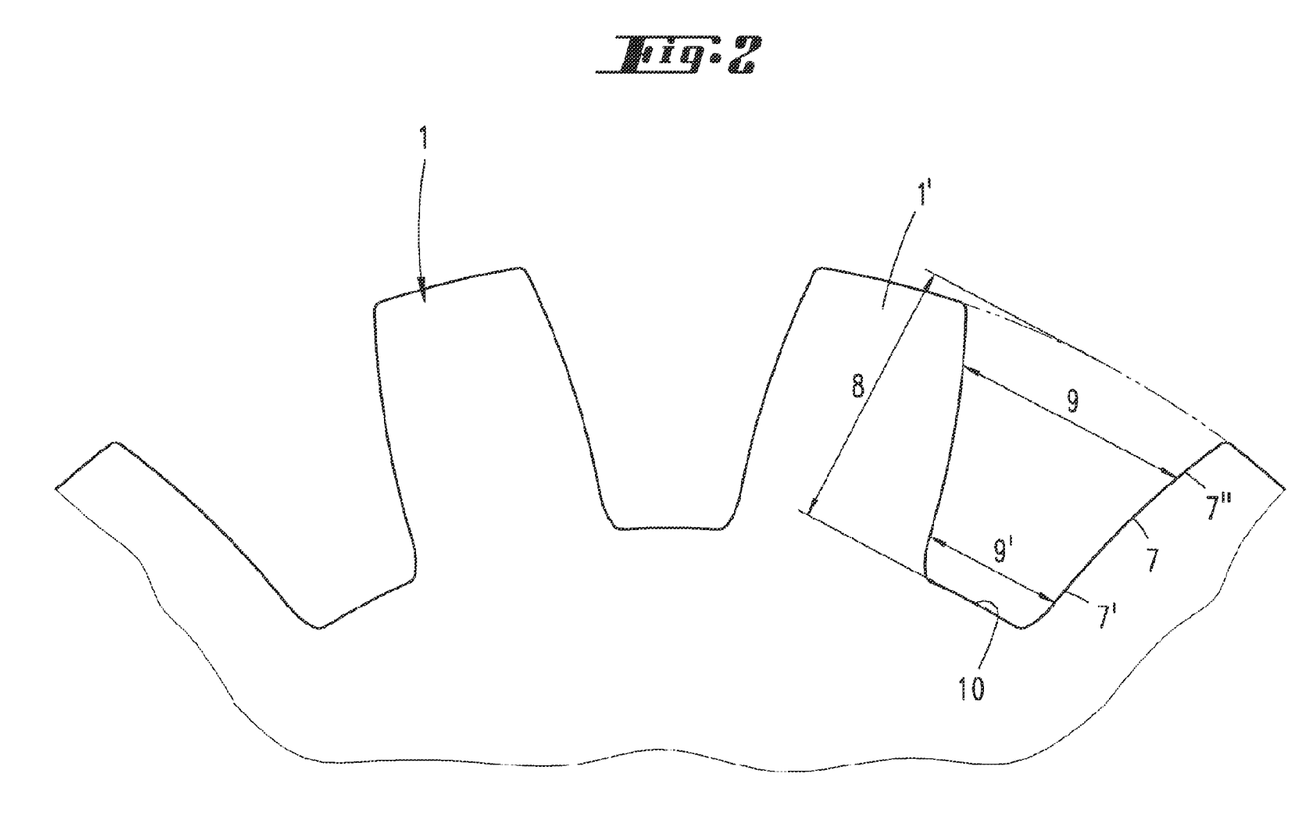
FIG. 2 shows an illustration according to FIG. 1 after a roughing operation.

Teeth 1' having a width B' are produced in the roughing machining illustrated in FIG. 1. The tooth gap widths 9, 9' of the tooth gaps produced by the roughing teeth 3 correspond to the roughing tooth widths 5, 5' of the roughing teeth 3 in the head region 9 and in the base region 9', respectively. The tooth gap depth 8, i.e., the distance of the tooth gap base 10 from the imaginary circumferential line of the workpiece 1, substantially corresponds to the roughing tooth height 4.

The roughing tooth widths 5, 5' and the roughing tooth height 4 are designed in such a way that in the roughing operation tooth gaps are produced between the teeth 1', the depth 8 of the tooth gaps corresponding to the target dimension. The tooth gap width 9' in the base region of the tooth 1', which corresponds to the roughing tooth width 5' at that location, substantially corresponds to the target dimension of the tooth gap to be produced. On the other hand, the tooth gap width 9 in the head region of the tooth 1' to be produced is smaller than the target dimension 9''. Accordingly, teeth 1' are produced, using the roughing tool 2, i.e., the roughing teeth 3, whose width B' is greater than the target dimension B.

Figure 3:
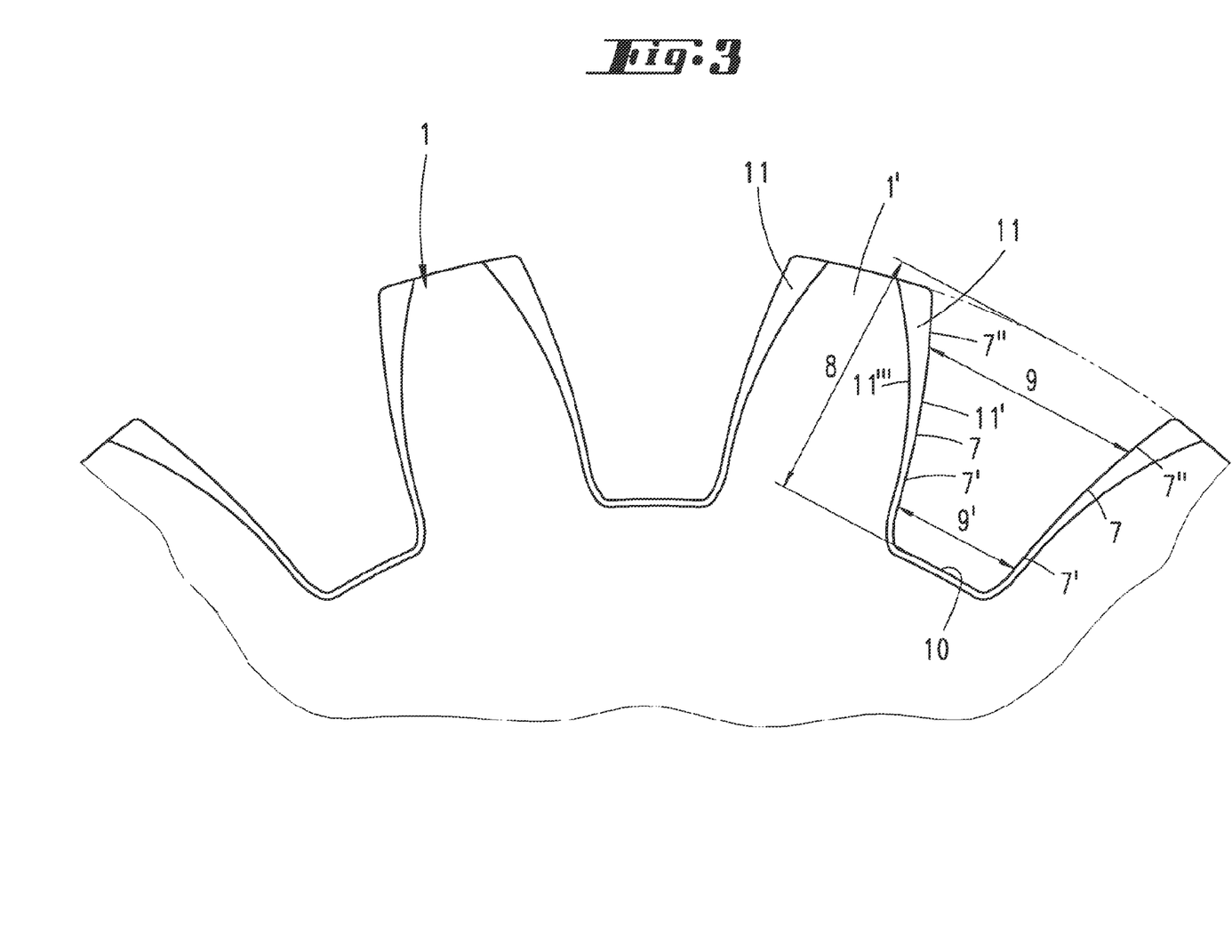
FIG. 3 shows an illustration corresponding to FIG. 2 after a deburring operation following the roughing operation, with chamfers 11 pressed out in the tooth flanks in the edge region, toward the end face.
Figure 4:
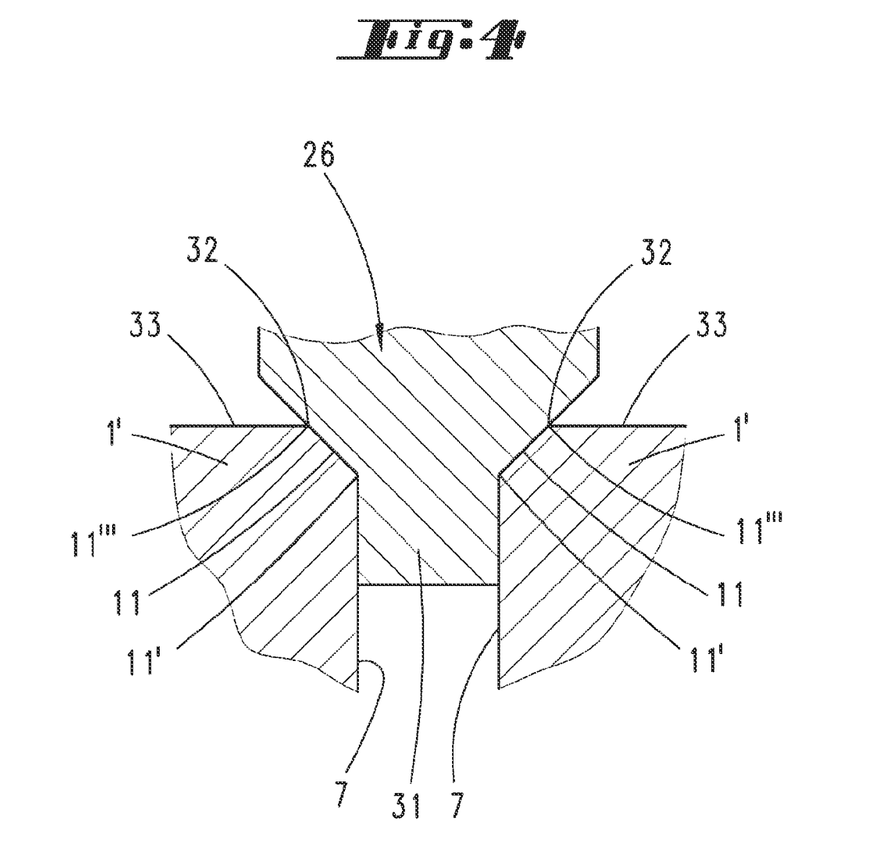
FIG. 4 shows a cross-section of a tooth gap between two workpiece teeth 1', with a roller compression tooth 31 of a roller compression tool 26 engaged for producing the chamfer 11.

The border edges of the tooth flanks 7 toward the end face 33 of the workpiece 1 are machined in the second method step illustrated in FIGS. 3 and 4. Chamfers 11 are pressed into the material of the workpiece 1 in the region of these edges, using the roller compression tool 26 and the roller compression teeth 31 thereof. For this purpose, the roller compression tooth 31 has inclined, oppositely situated compression flanks 32. The secondary burrs which occur on the end face 33 are removed by one or more cutting wheels 27. The tool used in the present case may basically have a configuration as described in DE 102 49 039 B4. Thus, two roller compression tools and two cutting wheels may also be provided. Reference is therefore made to DE 102 49 039 B4 with regard to the roller compression method.

The roller compression tool 26 according to the invention has roller compression teeth 31 having compression flanks 32 which are configured in such a way that comma-shaped chamfers 11 are pressed into the tooth flanks 7 produced in the roughing operation. The transition edge 11' at which the chamfer 11 merges into the tooth gap flank 7, and the chamfer edge 11''' at which the chamfer 11 merges into the end face 33, diverge from the base toward the head of the tooth V. The chamfer 11 is therefore wider in the head region 7'' of the flank 7 than in the base region 7' of the flank 7.

In a variant of the invention, it is provided that the roller compression tool 26 according to the invention has such roller compression teeth 31 having compression flanks 32 which are configured in such a way that chamfers 11 having mutually parallel border edges are pressed into the tooth flanks 7 that are produced in the roughing operation.

Figure 5:
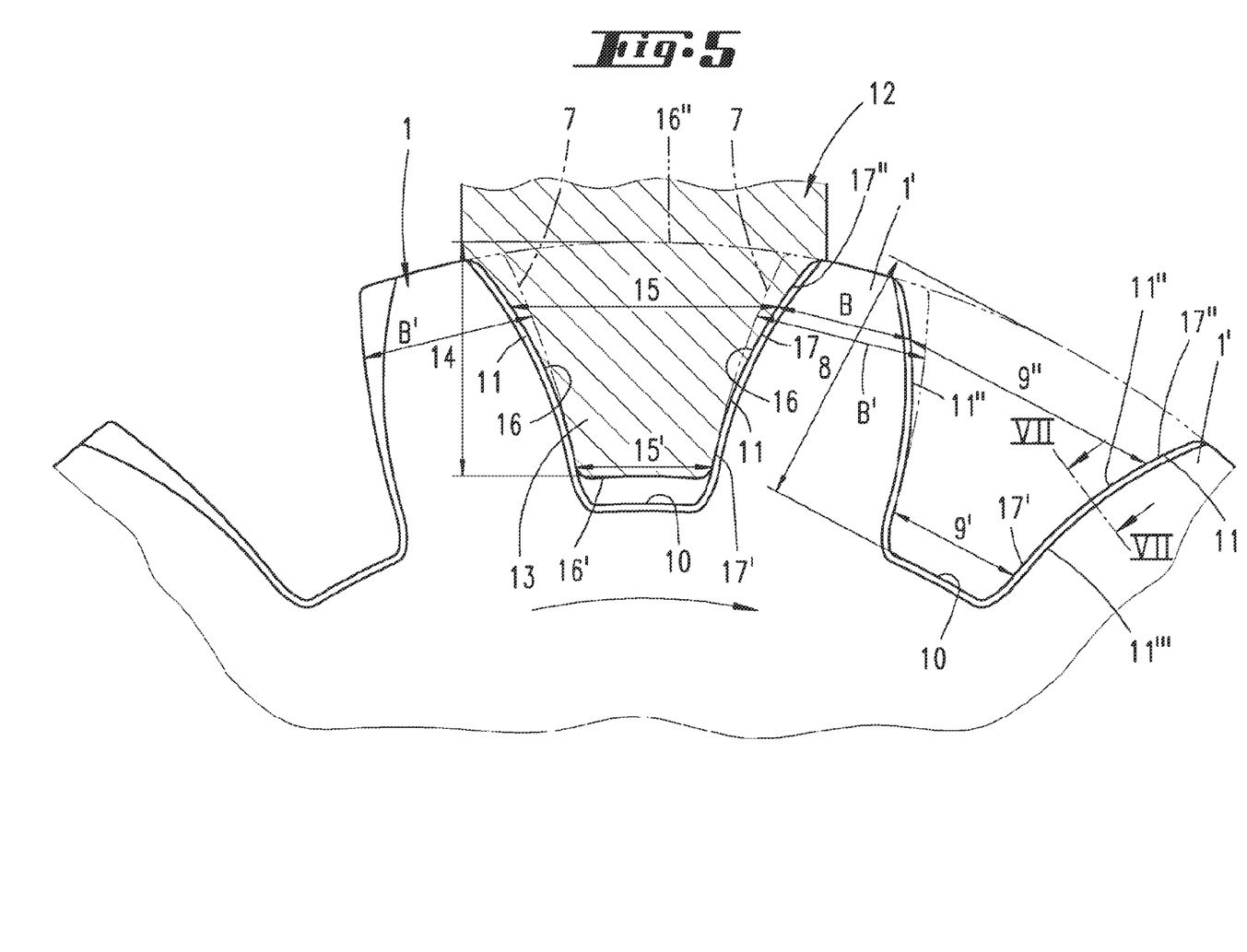
FIG. 5 shows an illustration corresponding to FIG. 1, with smoothing tooth 13 of a smoothing tool 12 engaged.

In the third method step illustrated in FIG. 5, the workpiece 1 which has been provided with a chamfer 11 according to FIG. 3 is precision machined. The first method step, i.e., the roughing operation, is carried out at a high feed rate and with a great cutting depth, i.e., with a high cutting power, whereas the smoothing operation is carried out with a lower cutting power.

The smoothing tool 12 is likewise a gear wheel-shaped tool as described in DE 10 2005 049 528 A1, for example. The smoothing tool has approximately the same shape as the roughing tool 2. However, the smoothing tool has differently configured smoothing teeth 13. The smoothing tooth height 14 measured from the base line 16'' to the head 16' of the smoothing tooth 13 is smaller than the roughing tooth height 4. The smoothing tooth height 14 is therefore also smaller than the tooth gap depth 8. Consequently, the surface of the head 16' of the smoothing tooth 13 which engages in the tooth gap is spaced at a distance from the tooth gap base 10 which has been produced by the roughing tooth 3. The width 15' of the smoothing tooth 13 at the head end substantially corresponds to the width 5' of the roughing tooth at the head end, and therefore approximately corresponds to the target dimension 9' of the tooth gap width. However, the width 15 of the smoothing tooth 13 at the base end is greater than the width 5 of the roughing tooth 3 at the base end, so that during smoothing, removal of material takes place in the head region 7'' of the tooth gap flank 7 and in a flank portion which also extends to the tooth base region 7'. In this removal of material, the tooth 1' having the width B' at that location is reduced in width to the target dimension B. In the smoothing operation, the machining allowance of the tooth width B' which is left in the roughing operation is thus reduced to the target dimension B, at least in the region in which the finished teeth roll off on teeth of different gear wheels when used as intended. The flank 17 thus produced hardly changes in the tooth base region 17', but changes greatly in the head region 17''. The progression of the flank 17 produced in the smoothing operation leaves a transition edge 11'' to the chamfer 11 which extends substantially parallel to the transition edge 11''' to the end face 33.

Figure 6:
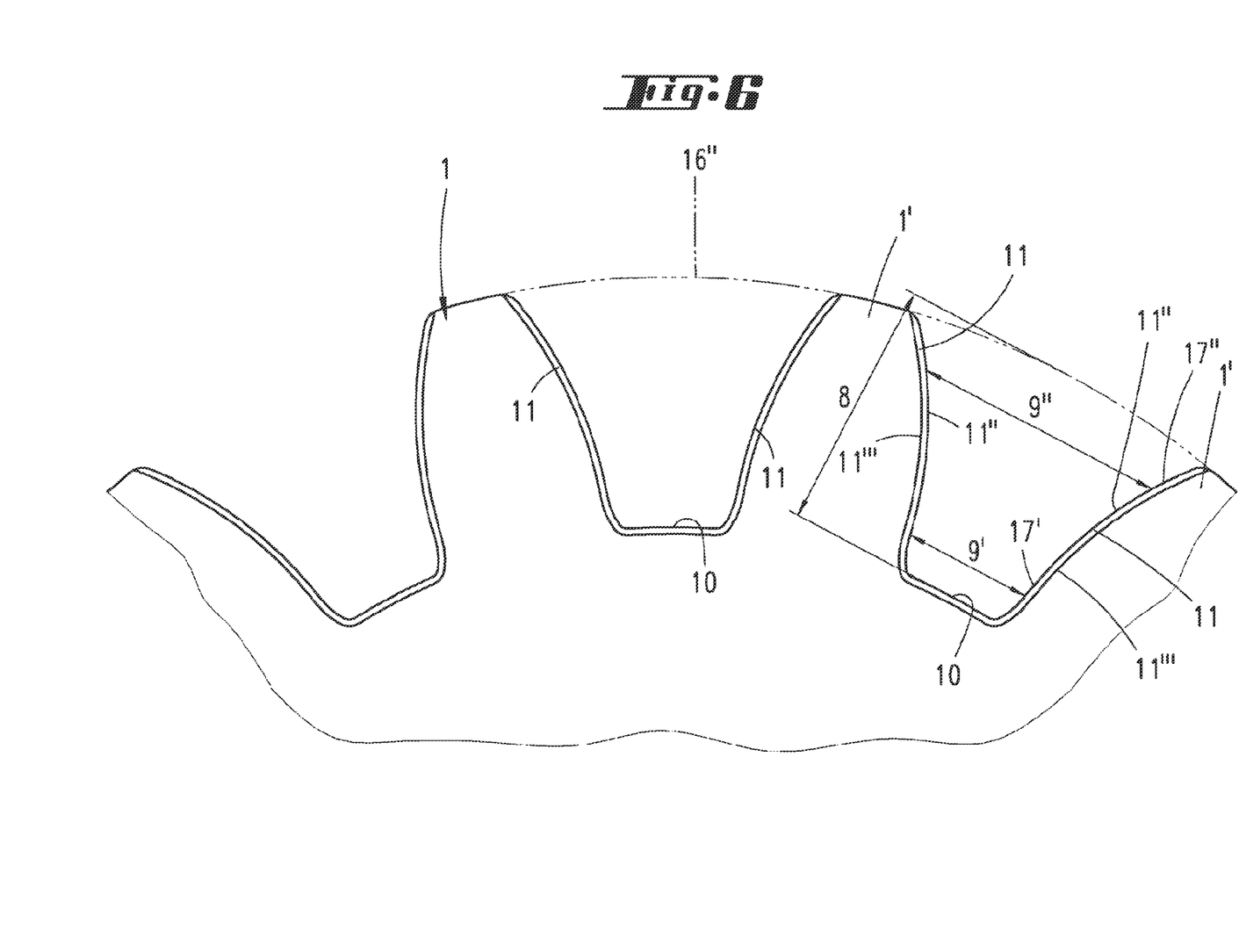
FIG. 6 shows an illustration, corresponding to FIG. 3, of the finished workpiece.
Figure 7:
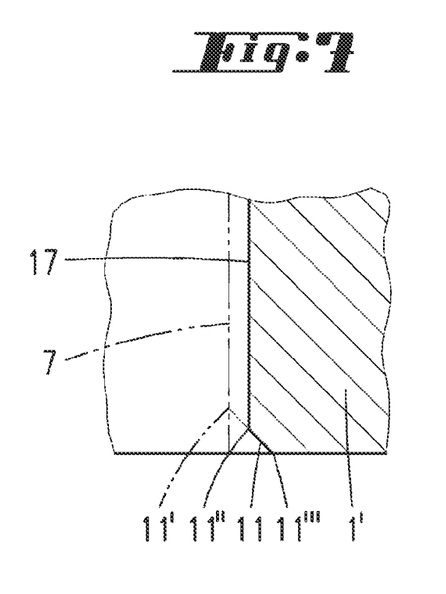
FIG. 7 shows a cross-section on the line VII-VII in FIG. 5.

It is apparent from FIG. 6 that the borders 11', 11'' of the chamfer 11 extend parallel to one another.

The method carried out using the machine tool illustrated in FIG. 9 differs from the method carried out using the machine tool illustrated in FIG. 8 solely in that after the deburring, the workpiece 1 is moved back to the tool spindle 24 in order to carry out the smoothing machining at this position.

The method according to the invention results in increased service life of the tools used.

All features disclosed are (in themselves) pertinent to the invention. The disclosure content of the associated/accompanying priority documents (copy of the prior application) is also hereby included in full in the disclosure of the application, including for the purpose of incorporating features of these documents in claims of the present application.

What is claimed is:

1. An apparatus for cutting gear teeth in workpieces, the apparatus comprising:
   a machine base body,
   a first tool spindle that is associated with the machine base body and that has a roughing tool having roughing teeth,
   a second tool spindle that is associated with the machine base body and that has a roller compression tool that is combined with a deburring wheel,
   a smoothing tool having smoothing teeth, which is accommodated either by a third tool spindle that is associated with the machine base body or by the first tool spindle, and
   a workpiece spindle for accommodating a workpiece,
   wherein tooth height of the roughing teeth of the roughing tool substantially corresponds to a target dimension of tooth gap depths of the gear teeth to be produced, but a width of the roughing teeth is narrower than a target width defined by spacing between tooth flanks of the tooth gap to be produced,
   wherein the compression teeth of the roller compression tool have at least one compression flank which produces a chamfer in the roughed gear teeth that is wider in a head region of a given one of the tooth flanks than in a base region of the one tooth flank, and
   wherein the smoothing teeth of the smoothing tool have a tooth height that is less than the tooth height of the roughing teeth, and have a tooth width that is greater than the tooth width of the roughing teeth, for producing the tooth gap at the target width.

2. The apparatus according to claim 1, wherein at least one of (A) the workpiece spindle and (B) the tool spindles is able to carry out a feed motion that is directed transverse to an infeed direction.

3. The apparatus according claim 1, wherein at least the first or the third tool spindle, and also the workpiece spindle, are rotationally drivable, the workpiece spindle and the at least the first or third rotationally driven tool spindle being maintained in synchronism.

4. The apparatus according to claim 1, wherein the tool spindles are arranged parallel to one another with their parallel axes extending substantially transverse to an infeed direction.

* * * * *